US012542043B2

(12) United States Patent
Wilson et al.

(10) Patent No.: US 12,542,043 B2
(45) Date of Patent: Feb. 3, 2026

(54) DYNAMIC CONTEXT AWARE RESPONSE SYSTEM FOR ENTERPRISE PROTECTION

(71) Applicant: Bank of America Corporation, Charlotte, NC (US)

(72) Inventors: Marlo A. Wilson, Charlotte, NC (US); Mary Anne Conner, Charlotte, NC (US); Mario Miccio, Jr., Brooklyn, NY (US); Caleb Hearn, Saint Augustine, FL (US); James Harry Dyer, Charlotte, NC (US); Jason Stracener, Anaheim, CA (US); Shiby Sugunan Parayil, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 25 days.

(21) Appl. No.: 17/952,456

(22) Filed: Sep. 26, 2022

(65) Prior Publication Data

US 2024/0105040 A1 Mar. 28, 2024

(51) Int. Cl.
*G08B 21/02* (2006.01)
*G08B 27/00* (2006.01)

(52) U.S. Cl.
CPC ........... *G08B 21/02* (2013.01); *G08B 27/001* (2013.01); *G08B 27/005* (2013.01)

(58) Field of Classification Search
CPC ........ G08B 21/00; G08B 21/02; G08B 21/10; G08B 21/12; G08B 21/14; G08B 21/16; G08B 21/18; G08B 21/182; G08B 21/20; G08B 21/22; G08B 23/00; G08B 27/001; G08B 27/005
See application file for complete search history.

(56) References Cited

U.S. PATENT DOCUMENTS

| | | | |
|---|---|---|---|
| 8,725,462 | B2 | 5/2014 | Jain et al. |
| 9,275,093 | B2 | 3/2016 | Pandey et al. |
| 9,342,976 | B2 | 5/2016 | Pfeffer |
| 9,917,735 | B2 | 3/2018 | Park |
| 10,043,373 | B2 | 8/2018 | Carr |

(Continued)

OTHER PUBLICATIONS

Mar. 20, 2024—U.S. Non-Final Office Action—U.S. Appl. No. 17/952,488.

(Continued)

*Primary Examiner* — Brian Wilson
(74) *Attorney, Agent, or Firm* — Banner & Witcoff, Ltd.

(57) ABSTRACT

Arrangements for providing context aware response functions are provided. In some examples, sensor data may be received from a plurality of sensors in a sensor data farm associated with an enterprise organization. The sensor data may be received from various types of sensors and/or from sensors from various vendors or manufacturers. a machine learning model may be executed to analyze the sensor data. Based on an output of the machine learning model, a determination may be made as to whether one or more enterprise-specific thresholds have been met or exceeded. If not, additional, subsequently received data may be analyzed. If so, one or more notifications or notification actions may be identified. In some examples, the notification or notification actions may be executed and response data may be received. The response data may be used to update and/or validate the machine learning model.

20 Claims, 13 Drawing Sheets

(56) References Cited

U.S. PATENT DOCUMENTS

| | | | |
|---|---|---|---|
| 10,257,136 B2 | 4/2019 | Wang et al. | |
| 10,410,156 B2 | 9/2019 | Lyras | |
| 10,586,219 B2 | 3/2020 | Chow et al. | |
| 11,218,584 B2 | 1/2022 | Martin et al. | |
| 2009/0153336 A1 | 6/2009 | Kates | |
| 2011/0103302 A1* | 5/2011 | Hall | H04W 4/021 370/328 |
| 2015/0097687 A1 | 4/2015 | Sloo et al. | |
| 2015/0163631 A1 | 6/2015 | Quam et al. | |
| 2015/0189005 A1 | 7/2015 | Dubois et al. | |
| 2016/0018799 A1 | 1/2016 | Gettings et al. | |
| 2017/0111210 A1 | 4/2017 | Chakrobartty et al. | |
| 2017/0162023 A1 | 6/2017 | Hunter et al. | |
| 2018/0159756 A1 | 6/2018 | Matthews et al. | |
| 2018/0357880 A1 | 12/2018 | Vijayakumari Mahasenan et al. | |
| 2019/0041822 A1 | 2/2019 | Burke et al. | |
| 2019/0094820 A1 | 3/2019 | Ray et al. | |
| 2019/0108739 A1* | 4/2019 | Wedig | G08B 17/10 |
| 2019/0122534 A1* | 4/2019 | McNutt | G08B 19/005 |
| 2019/0261145 A1 | 8/2019 | South et al. | |
| 2019/0333359 A1 | 10/2019 | Moroniti et al. | |
| 2020/0045522 A1 | 2/2020 | Horton et al. | |
| 2020/0139169 A1 | 5/2020 | Benefield | |
| 2020/0244805 A1 | 7/2020 | Philbin | |
| 2021/0073692 A1 | 3/2021 | Saha et al. | |
| 2021/0084436 A1 | 3/2021 | Sutherland | |
| 2022/0398913 A1* | 12/2022 | White | G08B 25/001 |
| 2023/0072905 A1 | 3/2023 | Chen et al. | |

OTHER PUBLICATIONS

Oct. 4, 2024—U.S. Final Office Action—U.S. Appl. No. 17/952,488.

Feb. 27, 2025—U.S. Non-Final Office Action—U.S. Appl. No. 17/952,488.

Costa et al., “A Distributed Multi-Tier Emergency Alerting System Exploiting Sensors-Based Event Detection to SUpport Smart City Applications”, Sensors, 20(1), 170, <https://doi.org/10.3390/s20010170> (Year: 2019).

Aug. 15, 2025—(US) Notice of Allowance—U.S. Appl. No. 17/952,488.

* cited by examiner

DYNAMIC CONTEXT AWARE RESPONSE SYSTEM FOR ENTERPRISE PROTECTION

BACKGROUND

Aspects of the disclosure relate to electrical computers, systems, and devices for providing dynamic sensor data normalization and context aware response functions for enterprise protection.

Enterprise organizations often have various systems in place for enterprise protection. These systems may rely on one or more sensors arranged at one or more enterprise locations. However, conventional arrangements merely consider sensor data in isolation and do not consider data from multiple sensors in combination. Further, conventional systems often rely on generic settings for triggering alarms or generating notifications. Accordingly, it may be advantageous to provide systems that use machine learning to evaluate sensor data and provide a context aware, self-learning system to continuously tune sensors, trigger points, and the like, to customize enterprise protection and response for an individual enterprise organization.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with providing context aware response functions.

In some examples, sensor data may be received from a plurality of sensors in a sensor data farm associated with an enterprise organization. The sensor data may be received from various types of sensors and/or from sensors from various vendors or manufacturers. In some examples, a machine learning model may be executed to analyze the sensor data. In some examples, the sensor data may be analyzed alone and in combination, using the machine learning model, to identify an issue or potential issue.

Based on the output of the machine learning model, a determination may be made as to whether one or more enterprise-specific thresholds have been met or surpassed. If not, additional subsequently received data may be analyzed. If so, one or more notifications or notification actions may be identified. In some examples, the notification or notification actions may be executed and response data may be received. The response data may be used to update and/or validate the machine learning model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates one example user interface that may be generated in accordance with one or more aspects described herein;

DETAILED DESCRIPTION

Figure 1A:
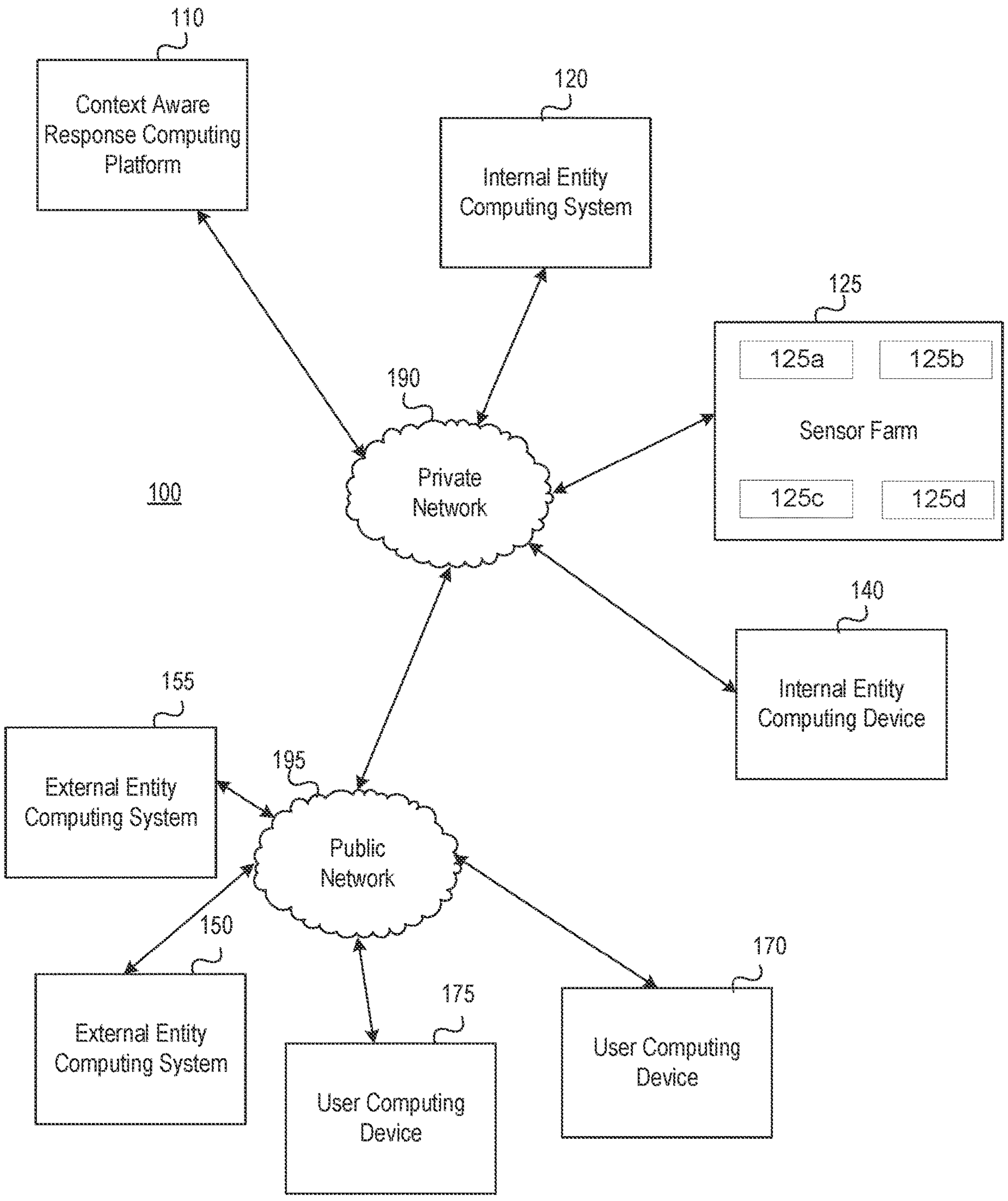
FIGS. 1A and 1B depict an illustrative computing environment for implementing sensor data normalization and context aware response functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, enterprise organizations are continually striving to ensure protection of personnel and assets. Accordingly, while conventional arrangements may rely on sensor data to quickly identify potential issues, they may not detect all issues or may not detect issues as quickly as would be advantageous.

Accordingly, arrangements described herein provide for sensor data that is normalized to provide vendor-agnostic outputs, and correlated to analyze the data holistically. These arrangements are provided in a self-learning environment that includes feedback loops to continuously tune and modify trigger settings, notification workflows, actions for execution, and the like.

For instance, an enterprise organization may have a plurality of sensors arranged at one or more locations. The sensors may include sensors of various types, manufacturers, and the like. In some examples, the sensors may be distributed at various geographic locations. Accordingly, the enterprise organization may identify initial settings or thresholds for triggering a notification or notification action. In some examples, the thresholds or settings may be based on vendor recommendations, enterprise-specific policies, government or regulating body requirements, and the like.

As data is captured from the plurality of sensors, the data may be normalized to provide outputs in a uniform format. In some examples, the uniform format may be specific to the enterprise organization. The normalized data may be aggregated and/or correlated and analyzed using, for instance, machine learning, to detect an issue or potential issue (e.g., water leak, fire, unauthorized actor at a location, and the like).

Upon detecting an issue or potential issue, one or more notifications or notification actions may be generated and executed. For instance, automated notifications may be sent to emergency personnel, enterprise personnel, and the like. Response data from the generated notifications and/or notification actions may be received and used to update and/or validate the machine learning model, the sensor settings or thresholds, and the like. Accordingly, the arrangements provided herein may continuously update for accuracy, efficiently, and the like.

These and various other arrangements will be discussed more fully below.

Figure 1B:
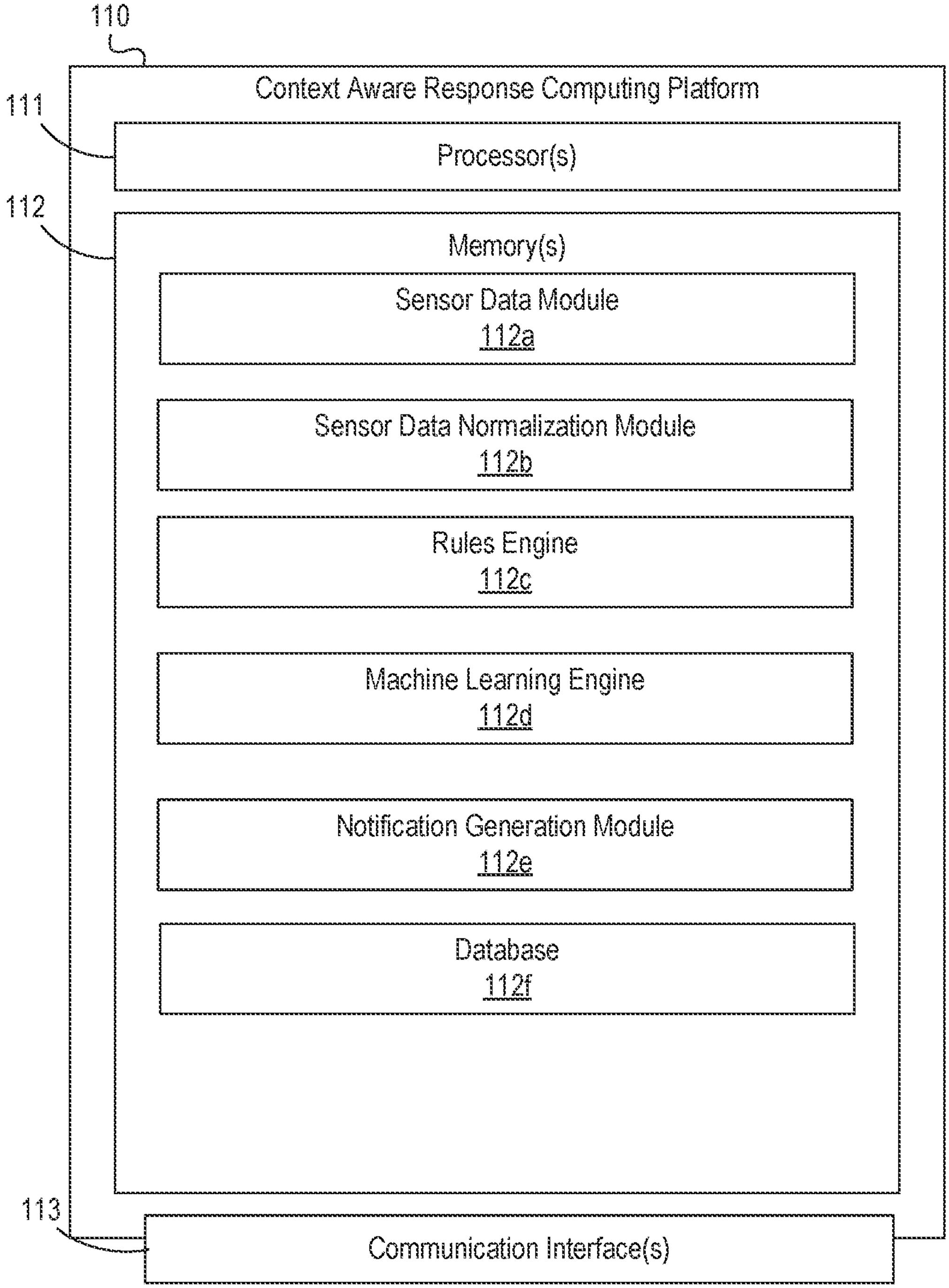

Aspects described herein may be implemented using one or more computing devices operating in a computing environment. For instance, FIGS. 1A-1B depict an illustrative computing environment for implementing sensor data normalization and context aware response functions in accordance with one or more aspects described herein. Referring to FIG. 1A, computing environment 100 may include one or more computing devices and/or other computing systems. For example, computing environment 100 may include context aware response computing platform 110, internal entity computing system 120, sensor farm 125, internal entity computing device 140, external entity computing system 150, external entity computing system 155, user computing device 170, and/or user computing device 175. Although one internal entity computing systems 120, one internal entity computing device 140, one sensor farm 125, two external entity computing systems 150. 155 and two user computing devices 170, 175 are shown, any number of systems or devices may be used without departing from the invention.

Context aware response computing platform 110 may be configured to perform intelligent, dynamic, and sensor data normalization and dynamic response functions. In some examples, context aware response computing platform 110 may be or include a cloud-based computing environment. In some examples, context aware response computing platform 110 may receive sensor data from one or more sensors 125*a*-125*d* in sensor farm 125. The sensors 125*a*-125*d* may include different types of sensors from different manufacturers or vendors. In some examples, each sensor may output or communicate using a vendor-specific format. Accordingly, context aware response computing platform 110 may use one or more adapters to modify or format the sensor data and normalize the data to an enterprise-specific format.

Context aware response computing platform 110 may analyze the normalized data using machine learning. For instance, a machine learning model trained on historical data may be executed to evaluate the normalized sensor data to identify any issues or potential issues. Based on the output of the machine learning model, one or more notifications, notification actions, workflows, and the like may be generated and/or executed.

Internal entity computing system 120 may be or include one or more computing systems, devices, or the like, that may host or execute one or more applications of an enterprise organization. For instance, internal entity computing system 120 may host or execute one or more applications in use by an enterprise organization (e.g., internally during the course of business, externally to provide services to one or more customers, and the like). Accordingly, internal entity computing system 120 may receive historical sensor data, data related to notifications sent and notification actions or workflows executed, outcomes of issues or potential issues, and the like. This data may be used to train one or more machine learning models.

Sensor farm 125 may include one or more sensors 125*a*-125*d*. Although four sensors 125*a*-125*d* are shown, more or fewer sensors may be used without departing from the invention. The sensors 125*a*-125*d* within sensor farm 125 may be various types of sensors (e.g., carbon monoxide sensor, temperature sensor, audio sensor, camera or image streams, moisture sensors, power sensors, panic button sensors, and the like). In some examples, the sensors 125*a*-125*d* may be located at one or more enterprise organization locations. For instance, one or more sensors 125*a*-125*d* may be physically located in one or more geographic locations of the enterprise organization (e.g., retail locations, office locations, warehouses, manufacturing facilities, data storage and processing centers, and the like).

As discussed herein, each sensor 125*a*-125*d* may output data in a format unique or proprietary to the manufacturer or vendor associated with the respective sensor 125*a*-125*d*. Accordingly, as data is output from the sensor farm 125, it may be formatted or modified to comply with an enterprise-specific format.

Further each sensor 125*a*-125*d* in sensor farm 125 may have a persona or profile associated therewith. In some examples, the persona may include data associated with the sensor (e.g., type, model, manufacturer, settings or alarm thresholds, and the like). For instance, context aware response computing platform 110 may store one or more personas or profiles for various sensors 125*a*-125*d* that have been previously installed. However, for new sensors 125*a*-125*d* for which a persona does not exists, a new persona may be generated and may use generic, default, or vendor-determined settings. Accordingly, data for these sensors, as well as other sensors in the sensor farm 125 may be captured and used to tune or modify the sensor settings and/or persona. In some examples, the tuning parameters may be specific to the enterprise organization, may include locality or regulating body regulations or requirements, or the like.

As sensors are installed, data may be captured and analyzed to tune each sensor 125*a*-125*d* to enterprise-specific settings, alarm or notification thresholds, and the like. These tuned settings may be stored in a sensor persona. Accordingly, a library of sensor personas may be created and, when new sensors are installed, if a persona exists for that sensor (e.g., type, model, vendor, or the like) the persona may be installed for that sensor. If not, a generic persona for that sensor may be used (e.g., including vendor or default settings) and the persona for the new sensor may be tuned as sensor data is received and analyzed.

Internal entity computing device 140 may be a computing device configured to communicate with context aware response computing platform 110. For instance, internal entity computing device 140 may be a computing device associated with a user, administrator, or the like within the enterprise organization that may control settings for the context aware response computing platform 110, monitor enterprise-specific settings and rules, monitor and implement regulations and requirements, and the like.

External entity computing system 150 and/or external entity computing system 155 may be or include one or more computing devices (e.g., servers, server blades, or the like) including one or more computing components (e.g., memory, processor, and the like) associated with an entity outside of or external to the enterprise organization. For instance, external entity computing system 150 and/or external entity computing system 155 may be associated with one or more external systems that may be notified of an issue or potential issue. For instance, an entity that owns a building being used by the enterprise organization, an emergency response entity, and the like, may be associated with one or more of external entity computing system 150 and/or external entity computing system 155.

User computing device 170 and/or user computing device 175 may be a user computing device (e.g., laptop, mobile device, wearable device, tablet, or the like) associated with one or more users, such as employees of the enterprise organization that may be notified of issues, registered users in an area near an enterprise location who may need to be notified of an issue or potential issue, and the like.

As mentioned above, computing environment 100 also may include one or more networks, which may interconnect one or more of context aware response computing platform 110, internal entity computing system 120, sensor farm 125, internal entity computing device 140, external entity computing system 150, external entity computing system 155, user computing device 170, and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, context aware response computing platform 110, internal entity computing system 120, sensor farm 125, and internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect context aware response computing platform 110, internal entity computing system 120, sensor farm 125, and internal entity computing device 140, and one or more other computing devices and/or computer systems that are used by, operated by, and/or otherwise associated with the organization. Public network 195 may connect private network 190 and/or one or more computing devices connected thereto (e.g., context aware response computing platform 110, internal entity computing system 120, sensor farm 125, and internal entity computing device 140) with one or more networks and/or computing devices that are not associated with the organization. For example, external entity computing system 150, external entity computing system 155, user computing device 170, and/or user computing device 175, might not be associated with an organization that operates private network 190 (e.g., because external entity computing system 150, external entity computing system 155, user computing device 170, and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, external entity computing system 155, user computing device 170, and/or user computing device 175 to private network 190 and/or one or more computing devices connected thereto (e.g., context aware response computing platform 110, internal entity computing system 120, sensor farm 125, and internal entity computing device 140).

Referring to FIG. 1B, context aware response computing platform 110 may include one or more processors 111, memory 112, and communication interface 113. A data bus may interconnect processor(s) 111, memory 112, and communication interface 113. Communication interface 113 may be a network interface configured to support communication between context aware response computing platform 110 and one or more networks (e.g., private network 190, public network 195, or the like). Memory 112 may include one or more program modules having instructions that when executed by processor(s) 111 cause context aware response computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of context aware response computing platform 110 and/or by different computing devices that may form and/or otherwise make up context aware response computing platform 110.

For example, memory 112 may have, store and/or include sensor data module **112*a*. Sensor data module 112*a* may store instructions and/or data that may cause or enable the context aware response computing platform 110 to receive sensor data from one or more sensors 125*a*-125*d* in a sensor farm 125. As discussed herein, the sensor farm 125 may include a plurality of sensors 125*a*-125*d* of different types and distributed at one or more enterprise locations. The data from the plurality of sensors may be received from the sensor farm 125 in a format specific to a vendor or manufacturer of the sensor. Further, in some examples, sensor data module 112*a* may store sensor personas associated with each sensor in the sensor farm 125** and may tune the sensor personas as sensor data is received and analyzed.

For example, the context aware response computing platform 110 may record readings from one or more sensors**125*a*-125*d*** and make continual adjustment of the configuration for the sensors. For instance, if the carbon monoxide sensor is initially configured to trigger an alarm if a level is above, for example, 0.003 ppm and based on the recent reports from a recent fire incident at a different location, it was determined that the appropriate threshold level is 0.002 ppm, the configuration is adjusted to set a new threshold at the newly identified level. This may result in an updated persona or a new persona may be generated for that sensor. In some examples, there may be two personas for a sensor. For instance, a generic sensor persona which may be vendor agnostic, and a vendor specific persona which may be a function of the version and model of the sensor. The feedback loop may provide continuous monitoring and tuning of the personas.

Context aware response computing platform 110 may further have, store and/or include sensor data normalization module **112*b*. Sensor data normalization module 112*b* may store instructions and/or data that may cause or enable the context aware response computing platform 110 to identify an adapter for each sensor associated with sensor data received from the sensor farm 125 and modify or format the data to an enterprise specific format. For instance, as data from each sensor in the sensor farm is received in its vender-specific format, an adapter configured to modify the vendor-specific formatted data to the enterprise-specific format may be identified and executed to normalize the data and integrate the data into the computing platform 110**. Accordingly, an adapter for each vendor, each type of sensor, each model sensor, or the like, may be used to normalize data from a particular sensor. The normalized data may then be further analyzed.

For example, a carbon monoxide sensor from a first vendor may have its own unique application programming interface (API) to the context aware response computing platform 110. An adaptor in the context aware response computing platform 110 will implement the API for the first vendor to the carbon monoxide sensors from that vendor. Further, some enterprise locations may have carbon monoxide sensors from a second, different vendor. However, the context aware response computing platform 110 may also have adapters to communicate with these sensors from the second vendor. So, to communicate with all the carbon monoxide sensors from all vendors, the context aware response computing platform 110 may have a library of carbon monoxide sensor adaptors that can be used to integrate sensors.

Similar adapter arrangements may be used for other types of sensors as well without departing from the invention.

Context aware response computing platform 110 may further have, store and/or include rules engine 112*c*. Rules engine 112*c* may store instructions and/or data that may cause or enable the context aware response computing platform 110 to store and/or execute one or more sensor data analysis rules, threshold modifications, notification or alert modifications, and the like. For instance, enterprise-specific rules related to sensor data thresholds to trigger an alarm may be stored. In some examples, regulations from one or more governing body or municipality may be stored by rules engine 112*c*. The rules generated by rules engine 112*c* may be used by machine learning engine 112*d* to analyze the data.

For instance, machine learning engine 112*d* may receive, as inputs, the normalized sensor data and may correlate the normalized sensor data and analyze the data based on, for instance, rules in the rules engine 112*c*. The machine learning engine 112*d* may host, execute, validate and/or update a machine learning model trained using historical data (e.g., via supervised or unsupervised learning techniques). For instance, in some examples, labeled datasets associated with previously received or historical sensor data, issues identified, and the like, may be used to train the machine learning model to identify patterns or sequences within the normalized sensor data being analyzed.

In some examples, executing the machine learning model may include analyzing data from each sensor individually, as well as in one or more combinations of sensors. For instance, data may be correlated such that combinations of data that, when considered alone might not indicate an issue but, in combination, may trigger a notification response may be analyzed alone and in various combinations to identify an issues or potential issues. In some examples, the correlations (e.g., types of sensors to combine for analysis) may be enterprise-specific, determined by a user, or the like.

The machine learning engine 112*d* may output, based on the execution of the machine learning model, an identification of an issue or potential issue, a notification to be generated, one or more notification actions or workflows to execute, and the like.

Context aware response computing platform 110 may further have, store and/or include notification generation module 112*e*. Notification generation module 112*e* may store instructions and/or data that may cause or enable the context aware response computing platform 110 to generate one or more notifications, generate an instruction or command to execute one or more notification actions or workflows in response to an identified issue or potential issue, and the like.

In some examples, machine learning engine 112*d*, rules engine 112*c* and notification generation module 112*e* may work in conjunction to identify appropriate notifications, notification actions or workflows. In some examples, different notifications may be generated based on a threshold surpassed or exceeded. For instance, one or more sensors or combinations of sensors may have more than one threshold for notification generation. Accordingly, if a first threshold is breached, a first notification or notification action or actions may be generated. If a second threshold is breached, a second notification or notification action may be generated. Is some examples, the second notification or notification action may be different from the first notification or notification action and/or may include the first notification or notification action, as well as additional notifications or notification actions.

Context aware response computing platform 110 may further have, store and/or include a database 112*f*. Database 112*f* may store data associated with sensor personas, historical sensor data, rules data, user registration data, and the like.

FIGS. 2A-2G depict one example illustrative event sequence for implementing context aware response functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
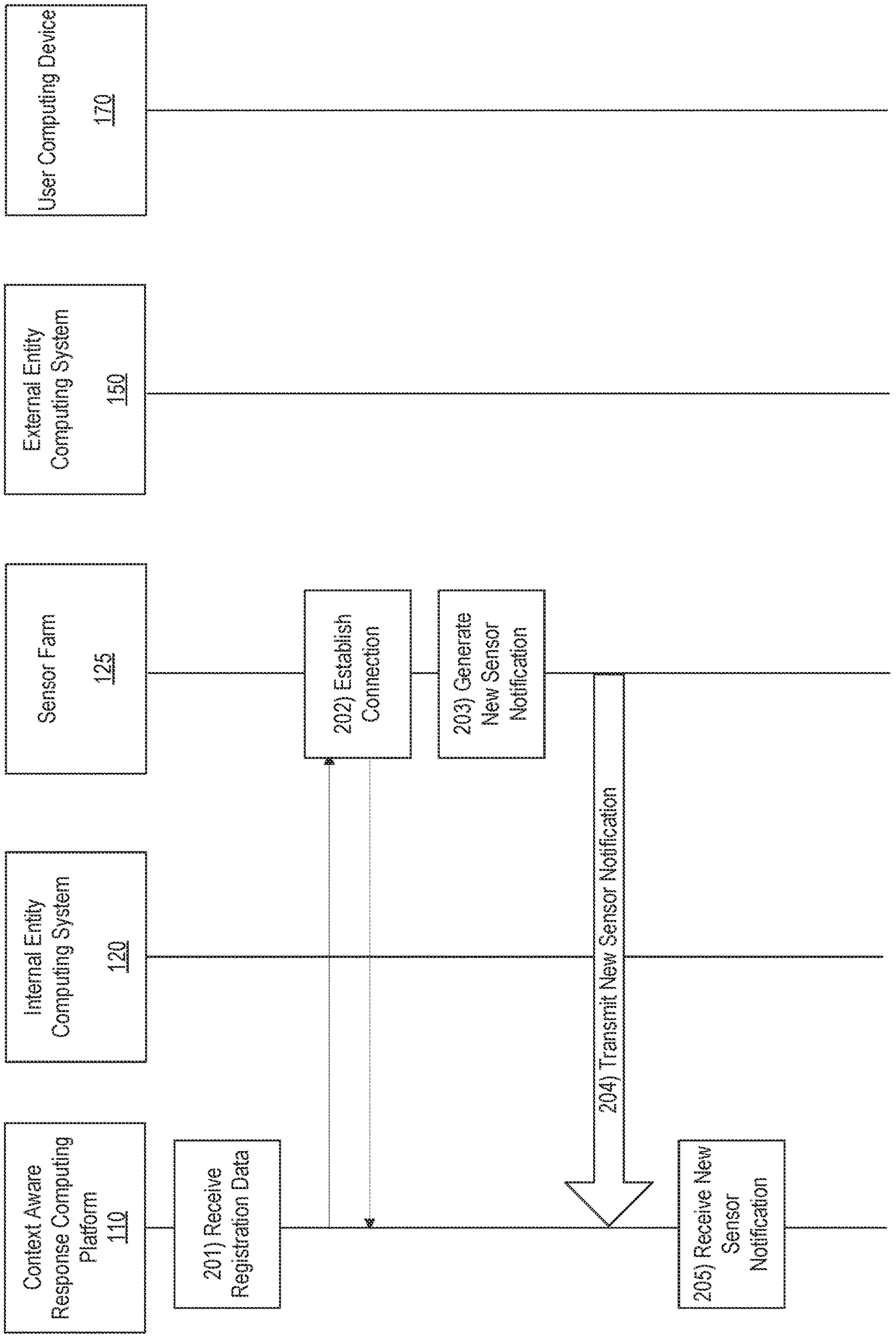
FIGS. 2A-2G depict an illustrative event sequence for implementing sensor data normalization and context aware response functions in accordance with one or more aspects described herein.

With reference to FIG. 2A, at step 201, context aware response computing platform 110 may receive registration data. For instance, registration data associated with one or more sensors, one or more computing devices, one or more enterprise locations, and the like, may be received. The registration data may include unique identifiers for devices or users, contact information (e.g., name, email address, mobile device number, or the like) for one or more users associated with a location, and the like.

At step 202, a sensor farm 125 may connect to context aware response computing platform 110. For instance, a sensor farm including a plurality of sensors associated with one or more enterprise location may establish a first wireless connection with the context aware response computing platform 110. The sensor farm 125 may include sensors located at disparate geographical locations that may be connected to or communicate with, for instance, via a cloud computing environment, with other systems or devices described herein. In some examples, the sensor farm 125 may include a plurality of different sensor types (e.g., carbon monoxide sensors, temperature sensors, water or moisture sensors, camera feeds, smoke detecting sensors, audio sensors, and the like). In some examples, the plurality of sensors may be from one or more vendors and may output data in a vendor specific format.

Upon establishing the first wireless connection, a communication session may be established between the sensor farm (e.g., one or more sensors in the sensor farm 125) and the context aware response computing platform 110.

At step 203, a new sensor notification may be generated by the sensor farm 125. For instance, a new or additional sensor may be installed in an enterprise location and may be connected to or communicate with the sensor farm 125. Upon detecting the new sensor, a new sensor notification may be generated and, at step 204, the sensor farm 125 may transmit or send the new sensor notification to the context aware response computing platform 110. In some examples, the new sensor notification may include information about the sensor such as type of sensor, manufacturer, model number, and the like.

At step 205, the context aware response computing platform 110 may receive the new sensor notification.

Figure 2B:
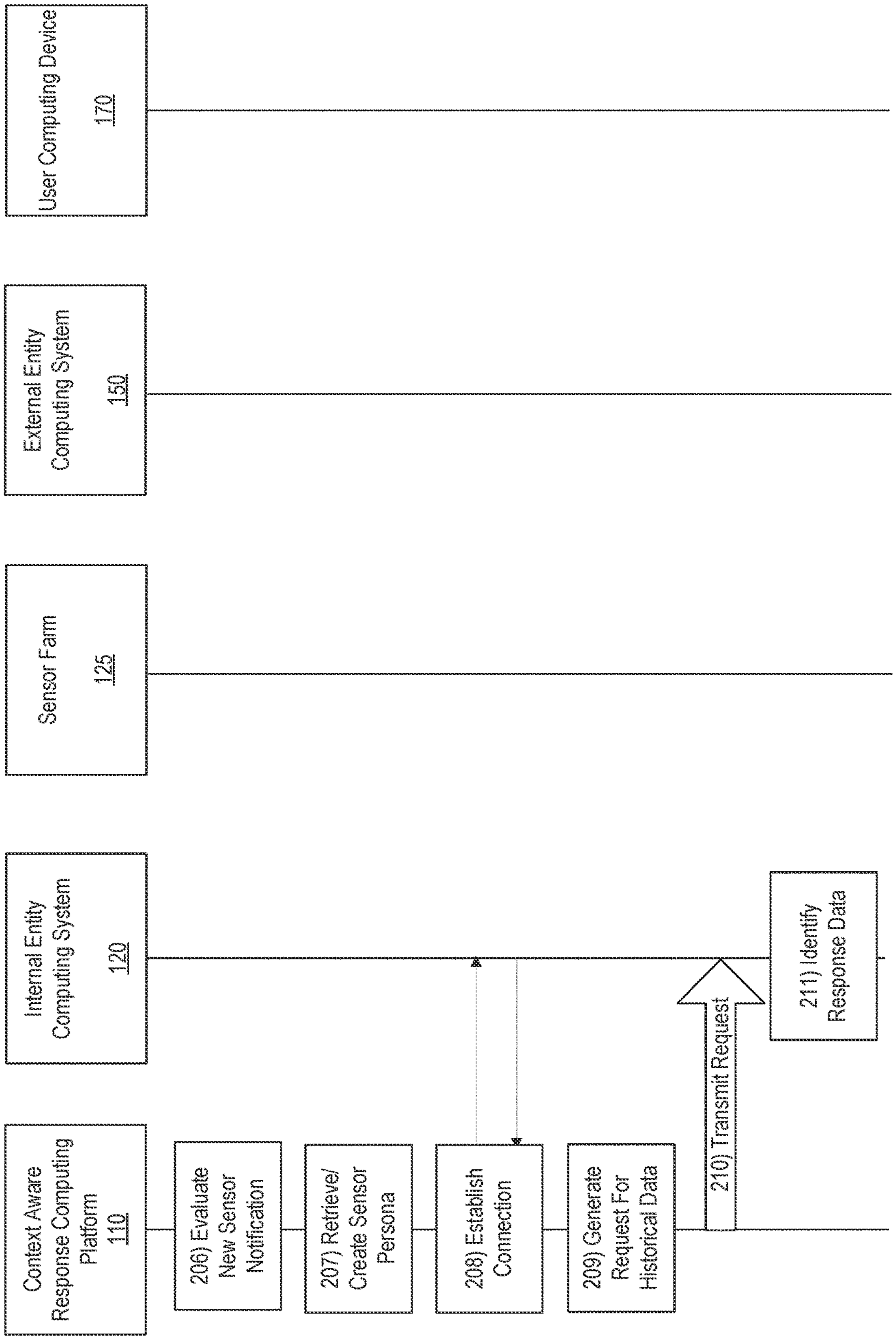

With reference to FIG. 2B, at step 206, context aware response computing platform 110 may evaluate the new sensor notification. For instance, context aware response computing platform 110 may extract data related to the new sensor (e.g., type, model, and the like) and may determine whether a sensor persona exists for that sensor. For instance, a plurality of sensor personas may be stored by the context aware response computing platform 110 (e.g., in database 112*g*). In some examples, each model of a sensor (e.g., a sensor that is currently part of the sensor farm 125) may have a unique persona that may include customized (and, in some examples, learned) settings, thresholds, data formatting, communications, and the like, associated with a respective model. When a new sensor is added, the model may be used to determine whether a persona for that sensor exists and, if not, may cause one to be created (e.g., using, for instance, default settings from the manufacturer that may be modified based on enterprise specific rules, local regulations, machine learning data, and the like).

At step 207, based on the evaluation of the new sensor, if the sensor has an existing persona it may be retrieved and, if not, a new persona may be generated for that sensor model. While aspects described herein include personas based on sensor model, in some arrangements, personas may be based on a type of sensor (e.g., some or all carbon monoxide sensors may share a persona), sensor manufacturer (e.g., sensors of a same type from a same manufacturer, even if different models, may share a persona), and the like.

At step 208, context aware response computing platform 110 may connect to internal entity computing system 120. For instance, a second wireless connection may be established between context aware response computing platform 110 and internal entity computing system 120. Upon establishing the second wireless connection, a communication session may be initiated between context aware response computing platform 110 and internal entity computing system 120.

At step 209, context aware response computing platform 110 may generate a request for historical data. For instance, historical sensor data, notifications sent based on sensor data, actions initiated, responses to actions, and the like, may be requested. In some examples, this historical data may be stored in one or more systems internal to the enterprise organization, such as internal entity computing system 120.

At step 210, the request for historical data may be transmitted by the context aware response computing platform 110 to the internal entity computing system 120. For instance, the request for historical data may be transmitted or sent during the communication session initiated upon establishing the second wireless connection.

At step 211, internal entity computing system 120 may receive the request for historical data and may identify response data.

Figure 2C:
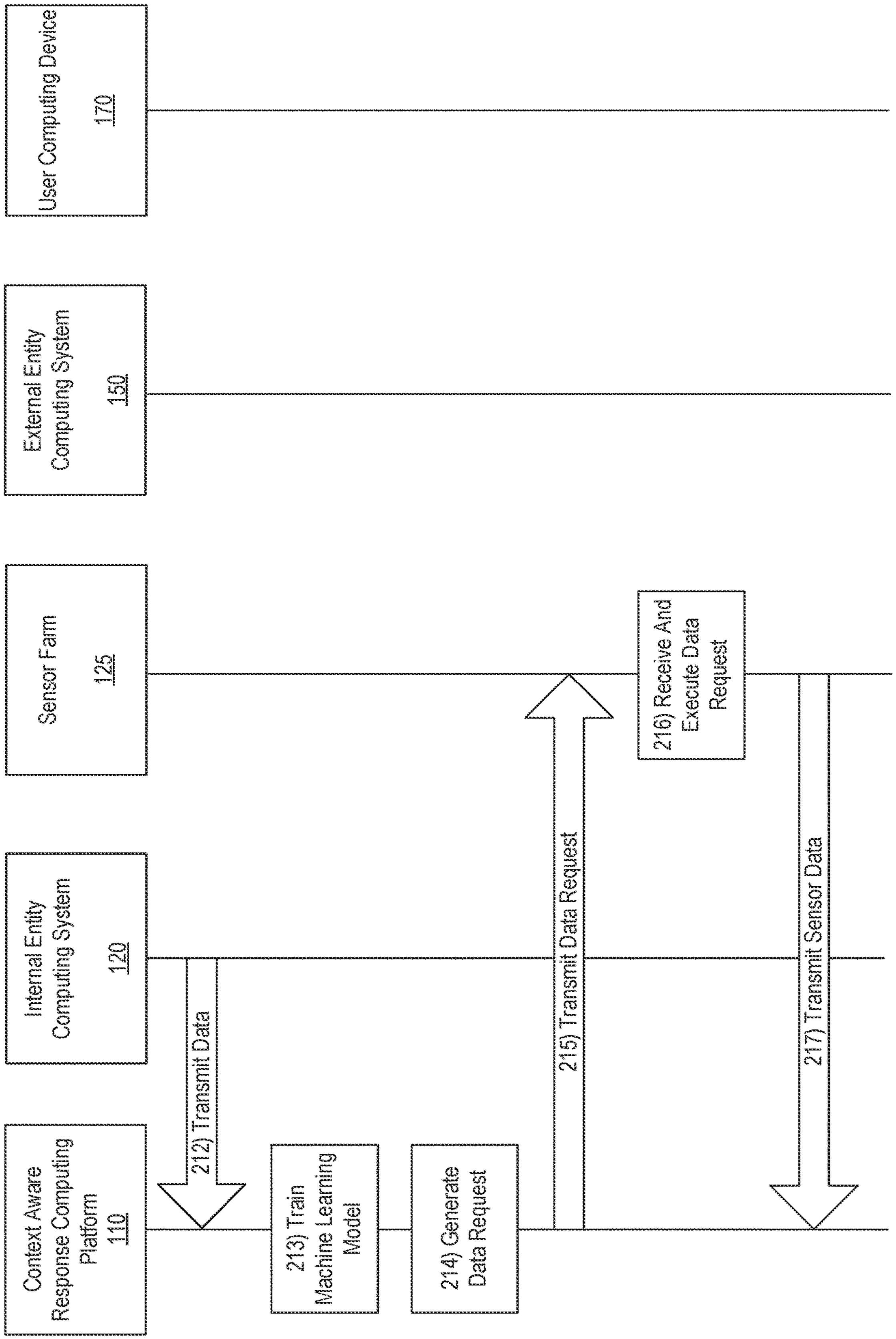

With reference to FIG. 2C, at step 212, internal entity computing system 120 may transmit or send the response data to the context aware response computing platform 110.

At step 213, the context aware response computing platform 110 may train one or more machine learning models. For instance, using one or more supervised or unsupervised learning algorithms, context aware response computing platform 110 may train one or more machine learning models using the received historical data as, for instance, training data. In some examples, labeled datasets including sensor outputs, actions initiated based on a sensor output, and an outcome of the action may be used to train the machine learning model. Accordingly, the machine learning model may identify patterns or sequences of data in subsequently received data based on the training data used. As subsequent data is received (e.g., current sensor data, actions identified, responses implemented), that data may be fed into the machine learning model via a feedback loop to update or validate the machine learning model. Accordingly, the model may be continuously learning and improving accuracy of predictions (e.g., predicted issues based on data from a sensor or combination of sensors, predicted notifications or responses, and the like).

In one example, labeled data indicating a type of sensor, sensor threshold for notification, sensor reading data, notification generated, and outcome or response to notification may be used to train the machine learning model. For instance, data from a carbon monoxide detector reading over a threshold value may have caused a notification that dispatched emergency response. This data may be used to train the machine learning model to identify patterns or sequences in subsequent data to generate appropriate notifications and/or response actions.

At step 214, context aware response computing platform 110 may generate a request for sensor data. For instance, context aware response computing platform 110 may generate a request for sensor data to be received from, for instance, an enterprise sensor farm 125. The request may include a request to continuously receive sensor data (e.g., a data stream) or to receive data at predetermined times or intervals (e.g., batch transfer of data).

At step 215, context aware response computing platform 110 may transmit or send the request for sensor data to the sensor farm 125. At step 216, the sensor farm may receive the request for data and execute the request. In some examples, executing the request may include initiating a data stream to continuously transmit sensor data from the one or more sensors associated with the sensor farm 125.

At step 217, sensor farm 125 may transmit or send the requested sensor data to the context aware response computing platform 110.

Figure 2D:
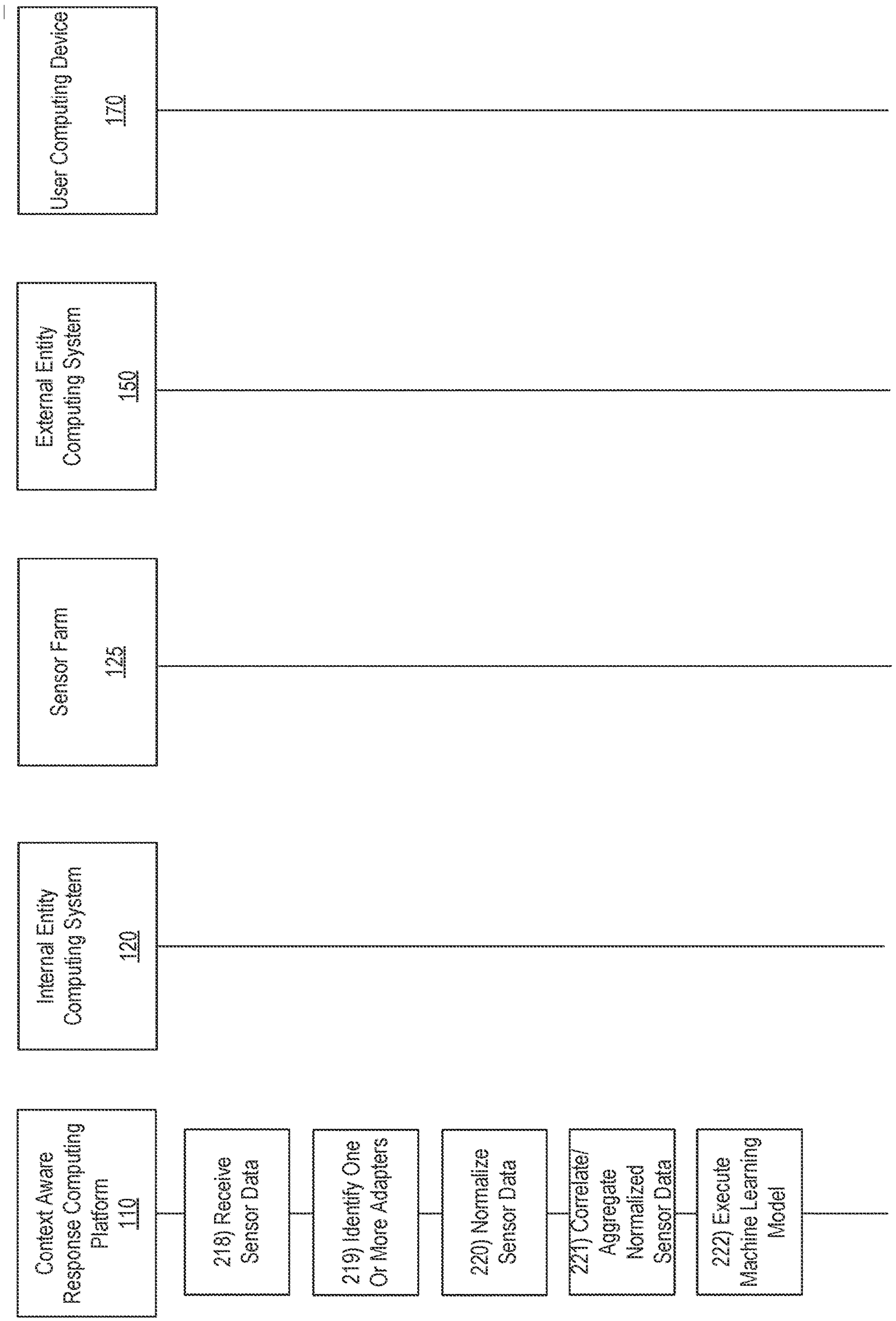

With reference to FIG. 2D, at step 218, context aware response computing platform 110 may receive the sensor data from the sensor farm 125.

At step 219, context aware response computing platform 110 may identify one or more adapters to modify or format sensor data received from the sensor farm 125. For instance, data received from the sensor farm may include data from different types of sensors, different sensor models, sensors from different manufacturers, and the like. In some examples, the sensors may output data in different formats (e.g., depending on manufacturer of the sensor). Accordingly, in order to efficiently aggregate and correlate data from the various sensors, the sensor data may be formatted or normalized to an enterprise-specific format. Accordingly, an adapter may be identified for data from one or more sensors to adapt or modify the sensor data received to reformat the data to the enterprise-specific format. In some examples, the adapters may be identified from a persona associated with the sensor from which data was received.

At step 220, the received sensor data may be formatted or normalized to the enterprise-specific format based on the one or more adapters. For instance, data from one or more sensors may be modified or converted, using the one or more identified adapters, to the enterprise-specific format.

At step 221, the context aware response computing platform 110 may aggregate or correlate the normalized data. For instance, data from various locations may be aggregated (e.g., by location, by area within a location, or the like) and correlations may be identified (e.g., combinations of sensor data may be executed to understand or identify potential safety or other issues at an enterprise location, in an area within an enterprise location, and the like). For instance, data from one or more combinations of sensors may be correlated to ensure a wholistic view of potential issues at a location. In one example, while a carbon monoxide sensor may have a moderately high reading that would not trigger an emergency response on its own, the carbon monoxide sensor reading in combination with a high temperature reading may indicate a fire at the location and an emergency response should be triggered.

At step 222, the context aware response computing platform 110 may execute a machine learning model to analyze the normalized, aggregated and/or correlated data. The machine learning model may evaluate data from individual sensors, as well as combinations of sensors, to identify patterns or sequences that may indicate an issue, may identify a notification or action response to generate or execute, or the like.

Figure 2E:
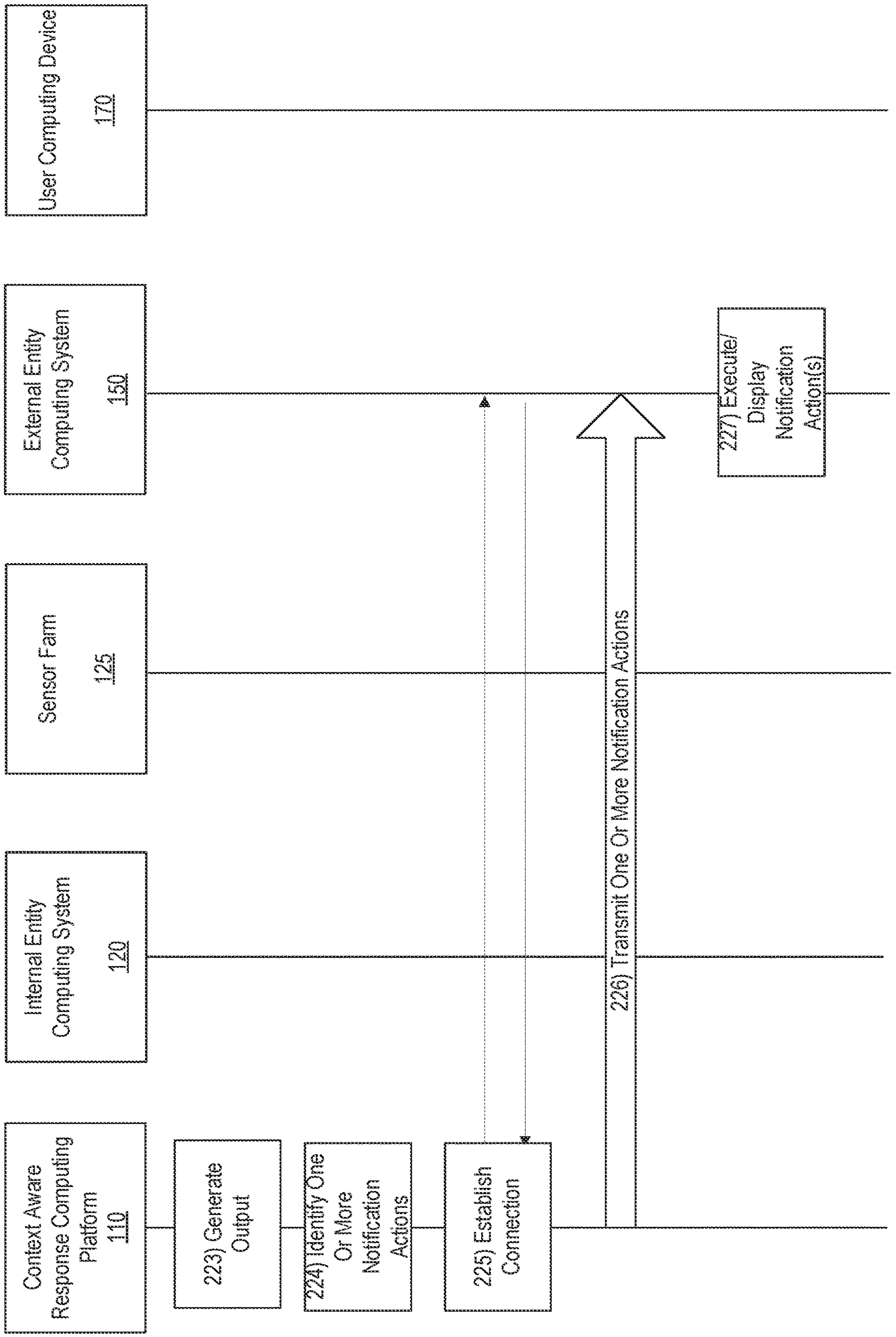

With reference to FIG. 2E, at step 223, context aware response computing platform 110 may generate an output from the executed machine learning model. The output may include a predicted issue or potential issue (e.g., safety issue, property damage issue, security issue, or the like) at one or more enterprise locations or area(s) within an enterprise location.

At step 224, based on the generated output, one or more notification actions may be identified. For instance, the context aware response computing platform 110 may identify, based on a predicted issue or potential issue, location, and the like, one or more users (e.g., employees, emergency personnel, or the like) to be notified of the issue or potential issue, one or more additional actions to automatically execute (e.g., requesting emergency services, notifying others within a predetermined distance of the location, halting a power supply to the location, or the like), and the like.

Figure 3:
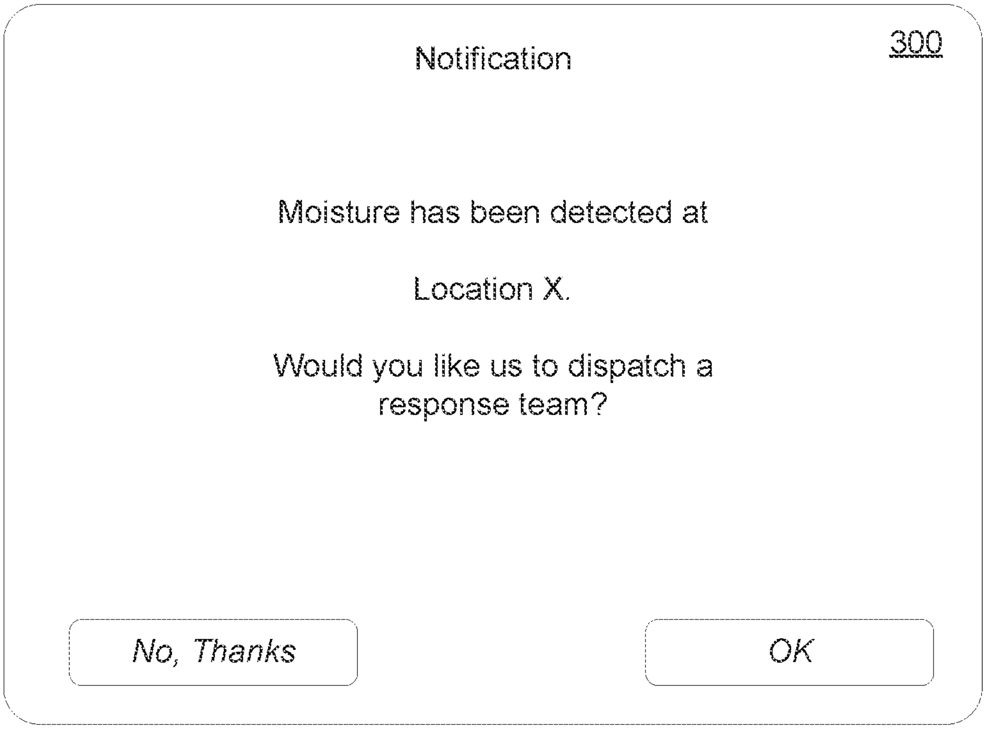
FIGS. 3 and 4 illustrate example notifications that may be generated according to one or more aspects described herein.

FIG. 3 illustrates one example notification that may be generated in accordance with one or more aspects described herein. As shown in FIG. 3, user interface 300 includes an indication that moisture was detected at a particular location. This may be based on analysis of sensor data from one or more sensors at the location. Accordingly, the interface provides an option to dispatch a response team (e.g., plumbing service, emergency response team, or the like) and a user (e.g., a manager at the location, an owner of the building (e.g., if other than the enterprise organization), a designated point of contact (e.g., as provided during registration), or the like, may select an option to dispatch a response team or an option to decline. In some examples, a plurality of users may be notified. Further, in some examples, notifications may be customized to a user or type of user (e.g., one notification for a building manager, another notification for emergency services, or the like).

Figure 4:
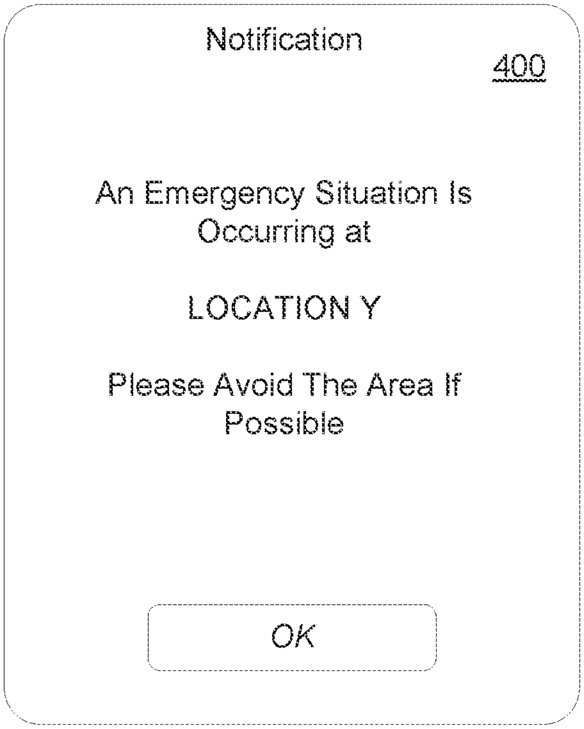

In some examples, context aware response computing platform 110 may identify an area around the impacted location and may create or generate a geo-fence representing the area. The geo-fence may be any size, shape, or the like and, in some examples, the size and/or shape of the geo-fence may be determined based on the identified issue or potential issue, based on machine learning analysis of the data, or the like. In some examples, registered users within the geo-fenced area may be notified of the issue or potential issue. For instance, if a fire is occurring at a location, a geo-fence may be generated that extends several blocks around the location and anyone inside of the geo-fenced area may be notified of the issue so as to avoid the area. That is, location data from registered users may be used to determine a current location or designated "home" location of users and, if within the geo-fenced area, the user may receive a notification. FIG. 4 illustrates one example notification 400 that may be transmitted to users within the geo-fenced area and indicates a location of the issue or potential issue and a notice to avoid the area if possible.

With further reference to FIG. 2E, at step 225, context aware response computing platform 110 may connect to external entity computing system 150. For instance, a third wireless connection may be established between context aware response computing platform 110 and external entity computing system 150. Upon establishing the third wireless connection, a communication session may be initiated between context aware response computing platform 110 and external entity computing system 150.

At step 226, one or more notifications or notification actions may be transmitted to external entity computing system 150. For instance, one or more notifications (e.g., indications of an issue or potential issue, such as shown in FIG. 3 and/or FIG. 4) and/or one or more notification actions (e.g., an instruction or command causing an action to occur by the external entity computing system 150 (e.g., dispatch assistance) may be transmitted for instance, during the communication session initiated upon establishing the third wireless connection.

At step 227, external entity computing system 150 may receive the notification and/or notification action and may display the notification and/or execute the one or more notification actions.

Figure 2F:
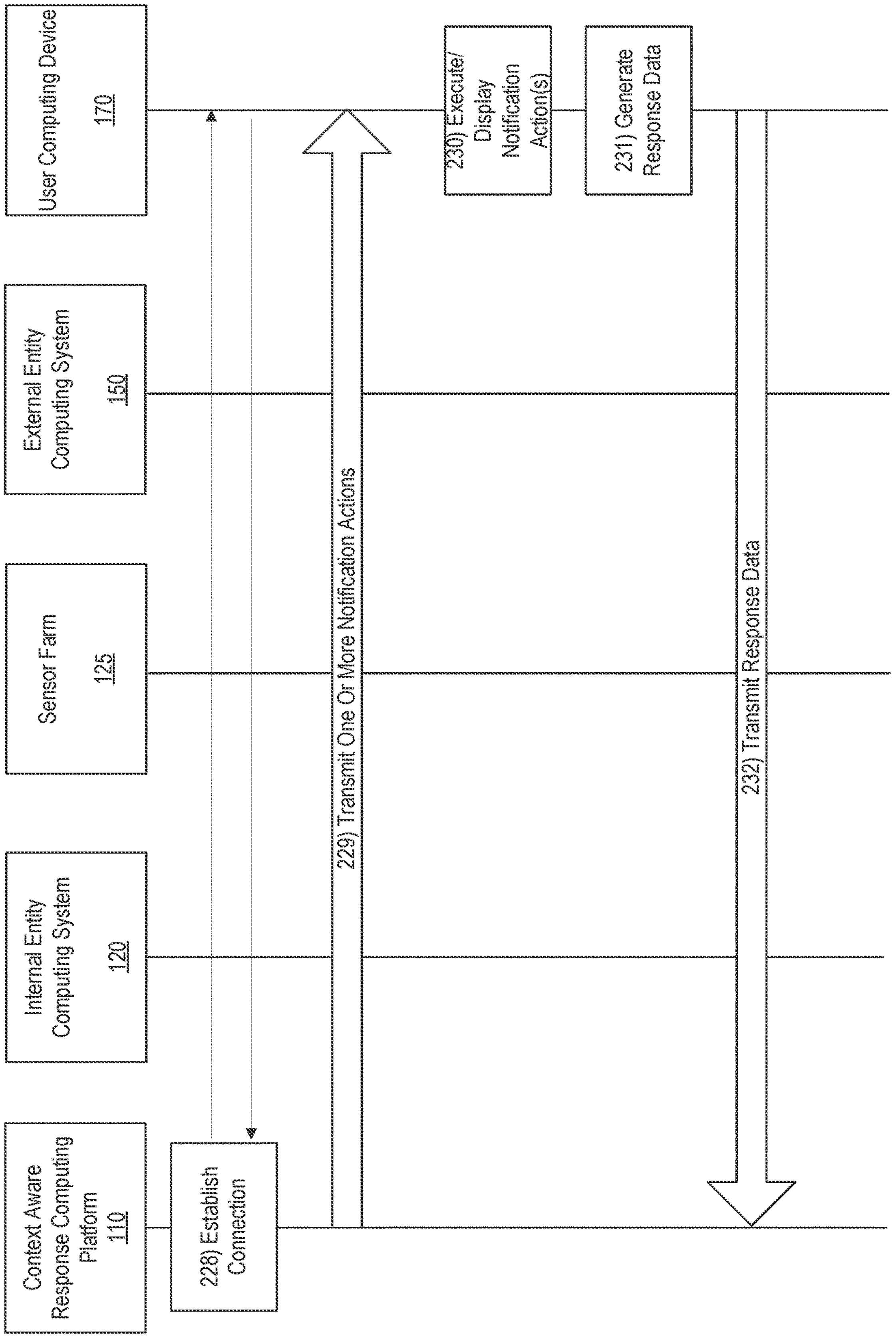

With reference to FIG. 2F, at step 228, context aware response computing platform 110 may connect to user computing device 170. For instance, a fourth wireless connection may be established between context aware response computing platform 110 and user computing device 170. Upon establishing the fourth wireless connection, a communication session may be initiated between context aware response computing platform 110 and user computing device 170.

At step 229, one or more notifications or notification actions may be transmitted to user computing device 170. For instance, one or more notifications (e.g., indications of an issue or potential issue, such as shown in FIG. 3 and/or FIG. 4) and/or one or more notification actions (e.g., an instruction or command causing an action to occur by the user computing device 170 (e.g., send additional automated messages, dispatch assistance, or the like) may be transmitted for instance, during the communication session initiated upon establishing the fourth wireless connection.

At step 230, user computing device 170 may receive the notification and/or notification action and may display the notification and/or execute the one or more notification actions.

At step 231, user computing device 170 may generate response data. For instance, in response to a notification, a user may provide user input acknowledging the notification, selecting one or more selectable options from the notification, or the like. Additionally or alternatively, if one or more notification actions have been received, the user computing device 170 may generate a response indicating the action was received, executed, or the like. In some examples, user input including additional response data may be received by the user computing device 170.

At step 232, the user computing device 170 may transmit or send the generated response data to the context aware response computing platform 110.

Figure 2G:
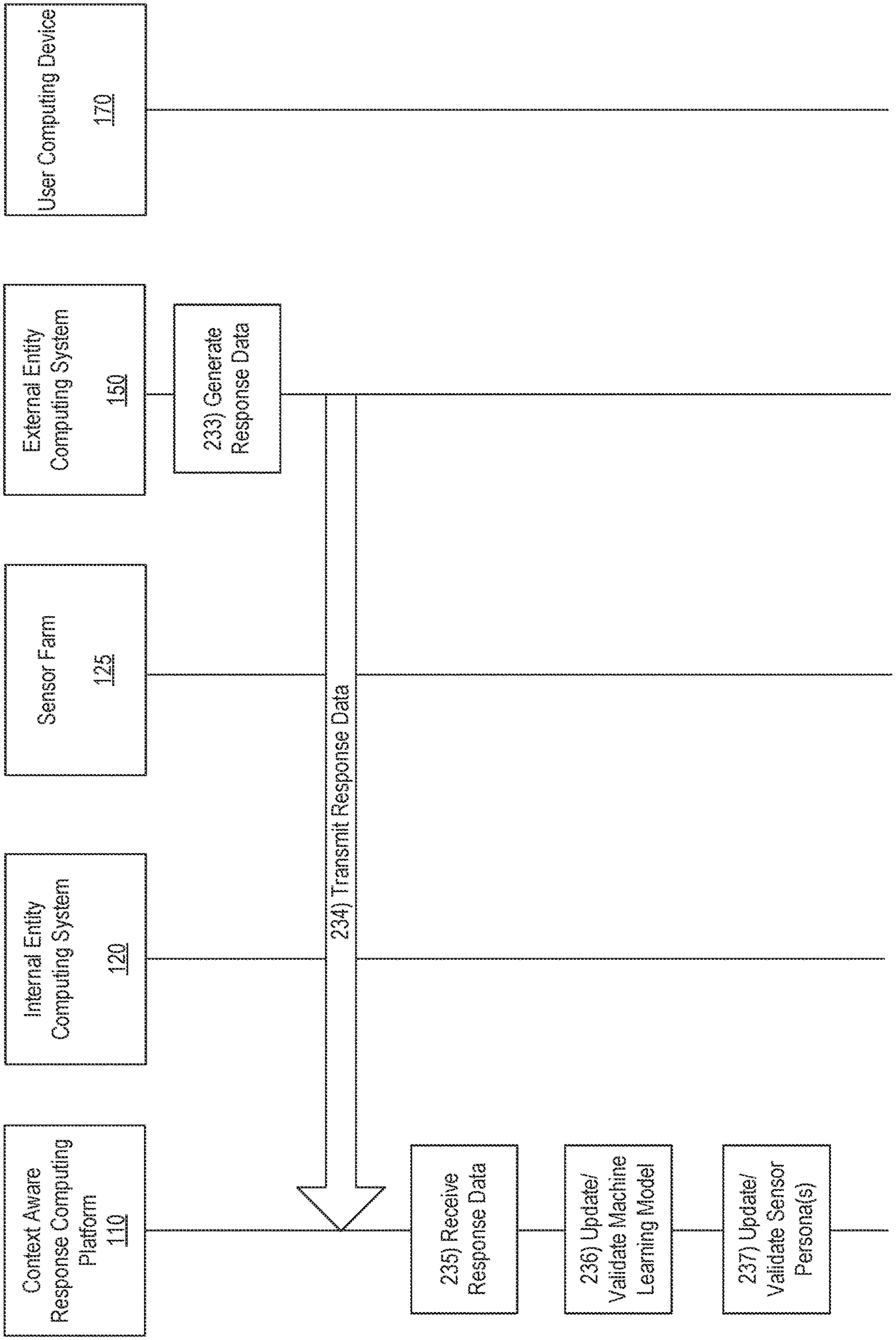

With reference to FIG. 2G, at step 233, external entity computing system 150 may generate response data. For instance, in response to a notification, a user may provide user input acknowledging the notification, selecting one or more selectable options from the notification, or the like. Additionally or alternatively, if one or more notification actions have been received, the external entity computing system 150 may generate a response indicating the action was received, executed, or the like. In some examples, user input including additional response data may be received by the external entity computing system 150.

At step 234, external entity computing system 150 may transmit or send the generated response data to the context aware response computing platform 110.

Although aspects shown include notifications and/or notification actions being sent to external entity computing system 150 and user computing device 170, in some examples, notifications and/or notification actions may be sent to one system or device, one type of system or device, or more than two systems, devices or types of systems or devices.

At step 235, context aware response computing platform 110 may receive the response data from the external entity computing system 150 and/or the user computing device 170.

At step 236, the one or more machine learning models may be updated and/or validated based on the received response data. For instance, data related to whether a proposed notification action was executed, and the like, may be used to update and/or validate one or more machine learning models to ensure continuously improving accuracy.

At step 237, in some examples, based on the updated machine learning model and/or response data, one or more sensor personas may be updated and/or validated. For instance, notification actions executed in response to detected issues or potential issues may be used to update or validate one or more sensor personas (e.g., validate threshold settings, modify threshold settings, and the like).

Figure 5:
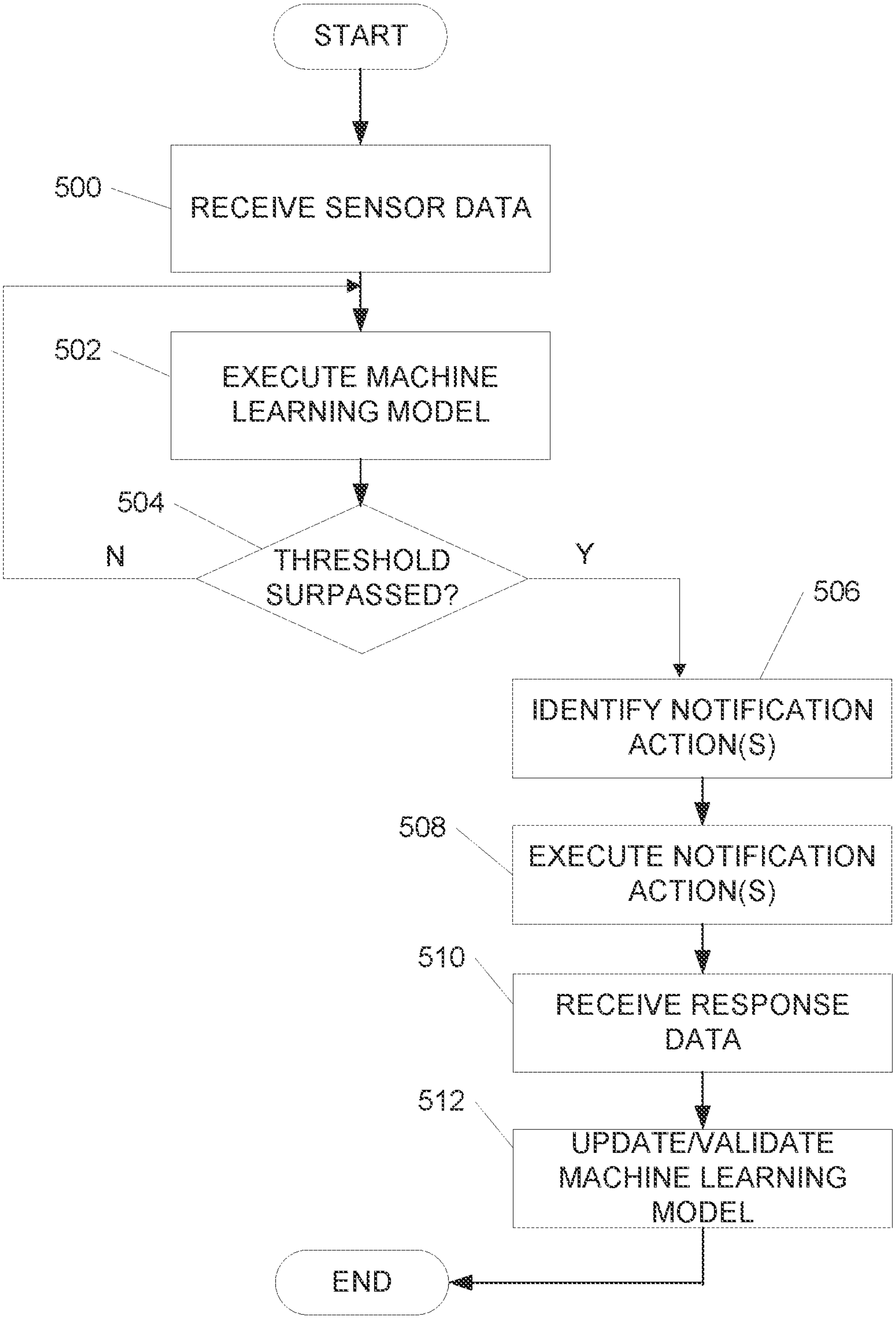
FIG. 5 illustrates one example method of implementing context aware response functions in accordance with one or more aspects described herein.

FIG. 5 is a flow chart illustrating one example method of implementing context aware response functions in accordance with one or more aspects described herein. The processes illustrated in FIG. 5 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 5 may be performed in real-time or near real-time.

At step 500, sensor data may be received from a plurality of sensors in a sensor farm. In some examples, the sensor farm may be associated with an enterprise organization and may include sensors arranged at various geographical or physical enterprise organization locations. The sensor farm may include sensors of a plurality of different types, from different manufacturers, and the like. In some examples, sensor data may be continuously received from the sensor farm.

At step 502, a machine learning model may be executed using the received sensor data as inputs. In some examples, the machine learning model may analyze the sensor data to determine or predict whether an issue is occurring or is predicted to occur. For instance, the machine learning model may evaluate sensor data alone (e.g., data from each individual sensor) and/or in combination (e.g., data from two or more sensors in combination) to determine whether an enterprise-specific threshold for the sensor or combination of sensors has been met or surpassed.

At step 504, a determination may be made as to whether one or more enterprise-specific thresholds has been met or surpassed. If not, the process may return to step 502 to evaluate subsequently received data.

If, at step 504, a threshold has been met or surpassed, at step 506, one or more notifications and/or notification actions may be identified. For instance, one or more notifications to transmit to one or more computing systems or devices (e.g., emergency responders, property managers, building owners, or the like) may be identified and/or generated. Additionally or alternatively, one or more notification actions may be identified. For instance, transmitting the generated notification to one or more predetermined users may be identified, automatically contacting emergency services, and the like, may be identified.

At step 508, the one or more identified notification actions may be executed. For instance, in some examples, these notification actions may be automatically executed (e.g., by the computing platform 110). Additionally or alternatively, executing one or more notification actions may include transmitting or sending a notification, instruction or command to one or more devices for execution (e.g., external entity computing system 150, user computing device 170, or the like).

At step 510, in response to executing one or more notification actions, response data may be received. For instance, data related to whether an action was executed, an outcome of the execution, user input indicating additional information in response to, for instance, a notification, and the like, may be received.

At step 512, the machine learning model may be updated and/or validated based on the received response data. In some examples, updating and/or validating the machine learning model may include updating and/or validating one or more sensor personas.

Figure 6:
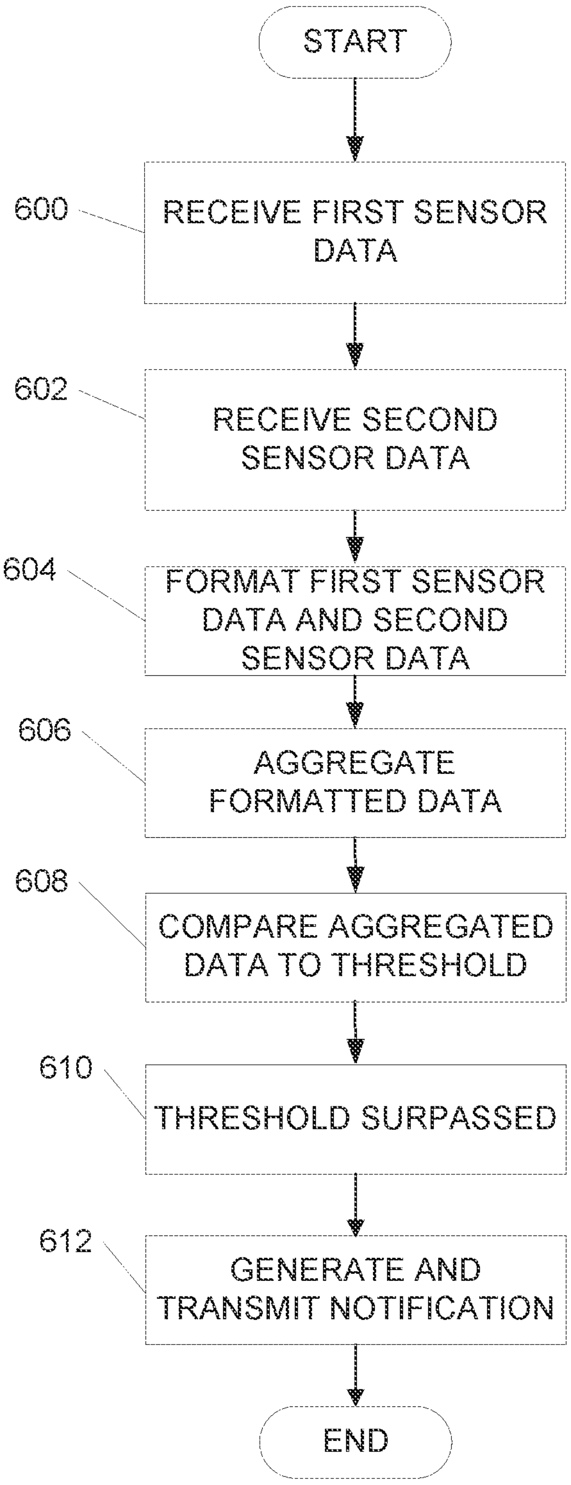
FIG. 6 illustrates one example method of implementing sensor data normalization functions in accordance with one or more aspects described herein.

FIG. 6 is a flow chart illustrating one example method of implementing sensor data normalization functions in accordance with one or more aspects described herein. The processes illustrated in FIG. 6 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 6 may be performed in real-time or near real-time.

At step 600, first sensor data may be received. For instance, sensor data from a first sensor of a first sensor type in a sensor farm associated with an enterprise organization may be received. In some examples, the first sensor data may be received in a first format unique to a first vendor or manufacturer associated with the first sensor.

At step 602, second sensor data may be received. For instance, sensor data from a second sensor of a second sensor type in the sensor farm associated with the enterprise organization may be received. In some examples, the second sensor data may be received in a second format unique to a second vendor or manufacturer associated with the second sensor.

At step 604, the first sensor data and second sensor data may be formatted from the first format and second format to a uniform format to, for instance, normalize the data. In some examples, the uniform format may be unique to the enterprise organization. In some examples, formatting the data may include identifying a first adapter to format or modify the first sensor data and a second adapter, different from the first adapter, to format the second sensor data. The respective adapter may then be used to confirm the data to the uniform format.

At step 606, the formatted data may be aggregated for further analysis. For instance, the formatted first sensor data and formatted second sensor data may be aggregated and/or correlated for analysis. In some examples, a machine learning model may be used to analyze the aggregated data. In some arrangements, the machine learning model may analyze data from each sensor, as well as combinations of data from two or more sensors that have been aggregated.

At step 608, the aggregated data may be compared to one or more thresholds. For instance, an enterprise specific threshold for data from one or more sensors or combinations of sensors may be compared to formatted data and/or aggregated data to determine whether one or more enterprise-specific thresholds have been surpassed.

At step 610, one or more enterprise-specific thresholds may be surpassed (e.g., based on the comparing). Accordingly, at step 612, in response to one or more enterprise-specific thresholds being surpassed, one or more notifications may be generated and transmitted to a computing device. In some examples, transmitting the notification to a computing device may cause the notification to be displayed by a display of the computing device.

Accordingly, aspects described herein are directed to normalizing sensor data received from a plurality of sensors of a plurality of types in a sensor farm associated with an enterprise organization, and analyzing the normalized sensor data to identify an issue or potential issue.

As discussed herein, aspects provide an intelligent, context aware cloud computing environment that orchestrates data from a plurality of sensors and aggregates data at a centralized level to provide notifications, notification actions, workflows, and the like to appropriate personnel, emergency responders, asset protection services, and the like. By receiving response data in response to identification of an issue or executing a notification action or workflow, a continuous feedback loop is used to reinforce or tune sensor settings, threshold settings, alarm or notification settings, and the like, based on data analytics, enterprise organization policies and privacy settings, locality regulations, and the like. The system provides a self-learning environment that automatically adjusts for personnel and asset safety.

As discussed herein, the system normalizes data from sensors associated with a plurality of vendors, correlates the information and performs data analytics to identify appropriate actions to execute. In some examples, geofencing may be used to identify users within an area that should be notified of an issue or potential issue.

The arrangements described herein enable customized responses for an enterprise based on captured enterprise data, enterprise-specific policies and requirements, locality regulations, and the like. Below are examples the context aware response arrangements described herein. The examples are merely some examples and additional arrangements may be used without departing from the invention.

For instance, the system may enable automated detection of fire by automated cross correlation of carbon monoxide level from one or more carbon monoxide sensors and temperature sensors. The context aware response computing platform 110, may identify and execute one or more notification actions, for instance, by extracting the location of the detected fire and transmitting a notification to emergency responders. Further, the context aware response computing platform 110 may transmit one or more notifications to enterprise personnel (e.g., a manager of the location, an asset protection worker, or the like). In some examples, a geofenced area may be identified and one or more users within the geofenced area (e.g., as determined with permission of the users during, for instance, a registration process) may also be notified. One or more notifications described herein may be transmitted via short message service (SMS), email, automated phone message, or the like.

In another example, unauthorized personnel may be detected in a location based on, for instance, detection of a panic alarm, analysis of camera feeds (e.g., using object recognition, and the like), audio sensor analysis, or the like. In some arrangements, enterprise communications may be analyzed to identify the issue or potential issue. In some examples, the context aware response computing platform 110 may identify one or more notification actions and execute the actions. For instance, emergency responders may be notified, one or more doors in the location may be locked or unlocked, power to the location may be modified, and the like. In some examples, a database of floorplans may be queried to identify a floor plan for the location and the identified floor plan may be transmitted to the emergency responders to understand a layout of the location.

In yet another example, if moisture sensor data at a location indicates a water leak, a notification may be triggered and a facilities department may be notified of the issue or potential issue.

In some arrangements, a first sensor threshold being exceeded may trigger a request for additional data. For instance, if a first sensor exceeds a first threshold, additional information such as camera feed data, additional sensor data, data from surrounding sensors, and the like, may be retrieved for further analysis.

In some examples, wearable device data from one or more registered users may also be received (e.g., with permission of the user) and analyzed to detect an issue or potential issue. For instance, a user may opt-in to provide wearable device data that may be analyzed (e.g., alone and in combination with other data) to identify potential issues at the location, with the user (e.g., a potential wellness issue), or the like.

In some examples, the context aware response computing platform 110 may integrate with existing systems of the enterprise organization to facilitate transmission of notifications, execution of notification actions, and the like. For instance, the system may integrate with one or more VOIP phone systems to transmit a notification to emergency personnel. Further, the systems may communicate with municipal emergency services, enterprise emergency services, and the like.

Accordingly, aspects described herein enable sensor data normalization and customized response actions based on a self-learning system to ensure enterprise protection.

Figure 7:
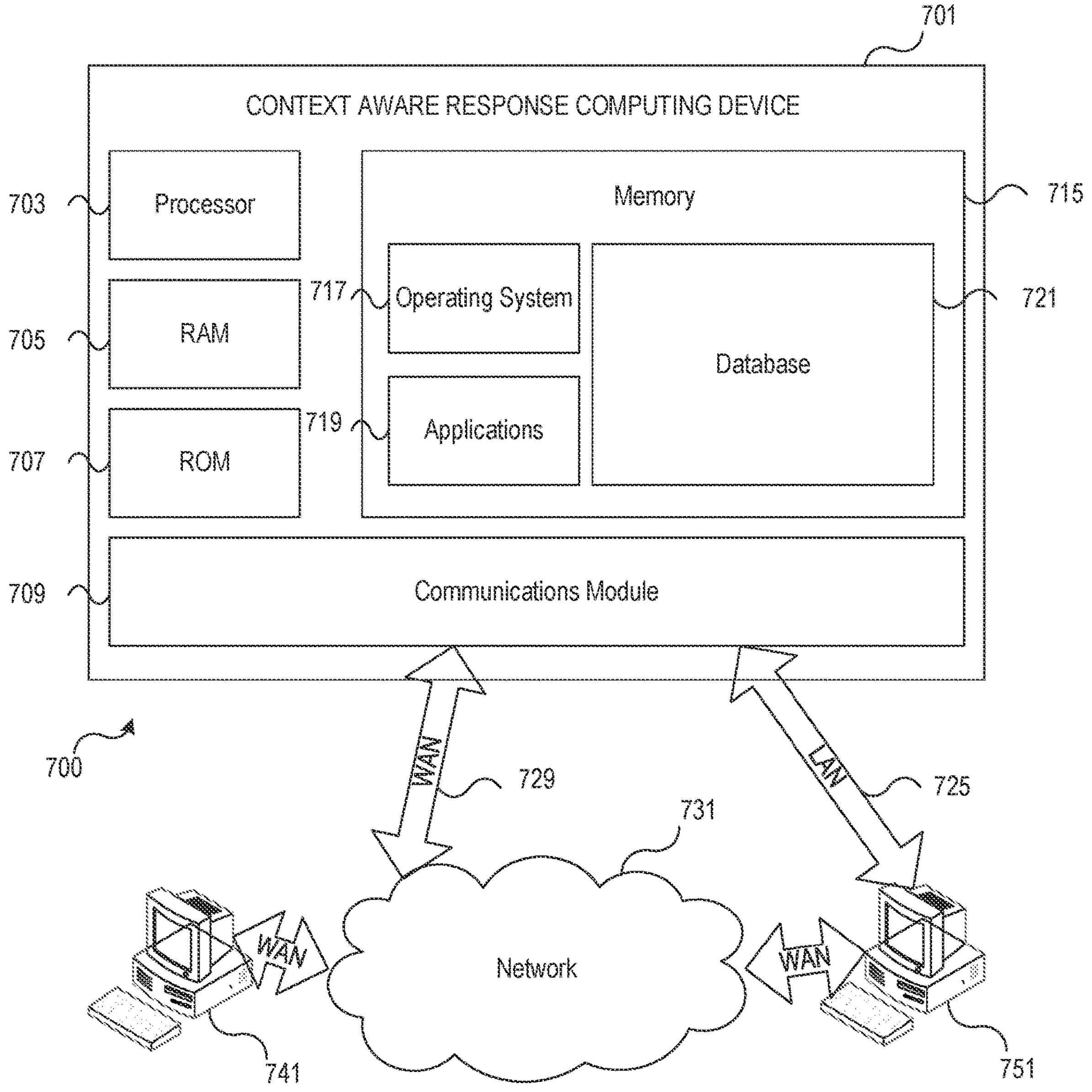
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include context aware response computing device 701 having processor 703 for controlling overall operation of context aware response computing device 701 and its associated components, including Random Access Memory (RAM) 705, Read-Only Memory (ROM) 707, communications module 709, and memory 715. Context aware response computing device 701 may include a variety of computer readable media. Computer readable media may be any available media that may be accessed by context aware response computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by context aware response computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on context aware response computing device 701. Such a processor may execute computer-executable instructions stored on a computer-readable medium.

Software may be stored within memory 715 and/or storage to provide instructions to processor 703 for enabling context aware response computing device 701 to perform various functions as discussed herein. For example, memory 715 may store software used by context aware response computing device 701, such as operating system 717, application programs 719, and associated database 721. Also, some or all of the computer executable instructions for context aware response computing device 701 may be embodied in hardware or firmware. Although not shown, RAM 705 may include one or more applications representing the application data stored in RAM 705 while context aware response computing device 701 is on and corresponding software applications (e.g., software tasks) are running on context aware response computing device 701.

Communications module 709 may include a microphone, keypad, touch screen, and/or stylus through which a user of context aware response computing device 701 may provide input, and may also include one or more of a speaker for providing audio output and a video display device for providing textual, audiovisual and/or graphical output. Computing system environment 700 may also include optical scanners (not shown).

Context aware response computing device 701 may operate in a networked environment supporting connections to one or more remote computing devices, such as computing devices 741 and 751. Computing devices 741 and 751 may be personal computing devices or servers that include any or all of the elements described above relative to context aware response computing device 701.

The network connections depicted in FIG. 7 may include Local Area Network (LAN) 725 and Wide Area Network (WAN) 729, as well as other networks. When used in a LAN networking environment, context aware response computing device 701 may be connected to LAN 725 through a network interface or adapter in communications module 709. When used in a WAN networking environment, context aware response computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive first sensor data from a plurality of sensors in a sensor farm associated with an enterprise organization;

tune, based on the received first sensor data from the plurality of sensors, each sensor of the plurality of sensors, wherein tuning each sensor includes tuning one or more parameters of a respective sensor based on locality regulations of the respective sensors and regulatory requirements;

store, in a library of sensor personas, the tuned parameters of each sensor in a sensor persona associated with the respective sensor, wherein the sensor persona further includes enterprise-specific thresholds for the respective sensor;

execute a machine learning model to analyze the first sensor data, wherein analyzing the first sensor data includes:

evaluating the first sensor data to determine whether an enterprise-specific threshold for the first sensor has been surpassed;

responsive to determining that an enterprise-specific threshold for the first sensor has been surpassed, identify one or more notification actions for execution, wherein identifying one or more notification actions for execution includes identifying a geo-fenced area including an area impacted by an event associated with the first sensor data surpassing the enterprise-specific threshold; and execute the one or more notification actions, wherein executing the one or more notification actions includes at least transmitting a notification to users within the geo-fenced area; and responsive to determining that an enterprise specific threshold for the first sensor has not been surpassed, evaluate second sensor data received subsequent to the first sensor data;

detect addition of a new sensor of a first type of sensor;

determine whether a sensor persona exists for the first type of sensor;

responsive to determining that a sensor persona exists for the first type of sensor:

retrieve, from the library of sensor personas, the sensor persona for the first type of sensor; and install, on the new sensor of the first type of sensor, the sensor persona for the first type of sensor;

responsive to determining that a sensor persona does not exist for the first type of sensor:

install, on the new sensor of the first type of sensor, a generic persona; and tune, using data received from other sensors of the plurality of sensors, the generic persona installed on the new sensor of the first type.

2. The computing platform of claim 1, wherein evaluating the first sensor data to determine whether the enterprise-specific threshold has been surpassed further includes:

evaluating data from each sensor of the plurality of sensors to determine whether an enterprise-specific threshold for the respective sensor has been surpassed; and evaluating two or more sensors of the plurality of sensors in combination to determine whether an enterprise-specific threshold for a respective combination of sensors has been surpassed.

3. The computing platform of claim 2, wherein identifying the one or more notification actions for execution includes identifying the one or more notification actions based on whether the enterprise-specific threshold for the respective sensor was surpassed or the enterprise-specific threshold for the respective combination of sensors was surpassed.

4. The computing platform of claim 1, wherein executing the one or more notification actions includes transmitting the notification to an external entity computing system.

5. The computing platform of claim 1, wherein executing the one or more notification actions includes transmitting the notification to a user computing device.

6. The computing platform of claim 5, wherein the user computing device is associated with a user identified during a registration process.

7. The computing platform of claim 1, further including instructions that, when executed, cause the computing platform to:

receive, via a feedback loop, response data received in response to executing the one or more notification actions; and update or validate the machine learning model based on the response data.

8. The computing platform of claim 1, wherein the plurality of sensors includes sensors having a plurality of different sensor types.

9. The computing platform of claim 8, wherein the plurality of different sensor types include one or more of: carbon monoxide sensors, temperature sensors, smoke detecting sensors, panic button activation sensors, camera feeds, audio sensors.

10. The computing platform of claim 1, wherein sensors of the plurality of sensors are located in geographically disparate locations.

11. The computing platform of claim 1, wherein sensor data is continuously received from the plurality of sensors in the sensor farm.

12. The computing platform of claim 1, wherein identifying the one or more notification actions for execution further includes identifying a floorplan for a location impacted by the event associated with the first sensor data surpassing the enterprise-specific threshold and wherein executing the one or more notification actions further includes transmitting the identified floorplan to first responders.

13. A method, comprising:

receiving, by a computing platform, the computing platform having at least one processor, and memory, first sensor data from a plurality of sensors in a sensor farm associated with an enterprise organization;

tuning, by the at least one processor and based on the received first sensor data from the plurality of sensors, each sensor of the plurality of sensors, wherein tuning each sensor includes tuning one or more parameters of a respective sensor based on locality regulations of the respective sensors and regulatory requirements;

storing, in a library of sensor personas, the tuned parameters of each sensor in a sensor persona associated with the respective sensor, wherein the sensor persona further includes enterprise-specific thresholds for the respective sensor;

executing, by the at least one processor, a machine learning model to analyze the first sensor data, wherein analyzing the first sensor data includes:

evaluating, by the at least one processor, the first sensor data to determine whether an enterprise-specific threshold for the first sensor has been surpassed;

responsive to determining that an enterprise-specific threshold for the first sensor has been surpassed, identifying, by the at least one processor, one or more notification actions for execution, wherein identifying one or more notification actions for execution includes identifying a geo-fenced area including an area impacted by an event associated with the first sensor data surpassing the enterprise-specific threshold; and executing, by the at least one processor, the one or more notification actions, wherein executing the one or more notification actions includes at least transmitting a notification to users within the geo-fenced area; and responsive to determining that an enterprise specific threshold for the first sensor has not been surpassed, evaluating, by the at least one processor, second sensor data received subsequent to the first sensor data;

detecting, by the at least one processor, addition of a new sensor of a first type of sensor;

determining, by the at least one processor, whether a sensor persona exists for the first type of sensor;

responsive to determining that a sensor persona exists for the first type of sensor:

retrieving, by the at least one processor and from the library of sensor personas, the sensor persona for the first type of sensor; and installing, by the at least one processor and on the new sensor of the first type of sensor, the sensor persona for the first type of sensor;

responsive to determining that a sensor persona does not exist for the first type of sensor:

installing, by the at least one processor and on the new sensor of the first type of sensor, a generic persona; and tuning, by the at least one processor and using data received from other sensors of the plurality of sensors, the generic persona installed on the new sensor of the first type.

14. The method of claim 13, wherein evaluating the first sensor data to determine whether the enterprise-specific threshold has been surpassed further includes:

evaluating data from each sensor of the plurality of sensors to determine whether an enterprise-specific threshold for the respective sensor has been surpassed; and evaluating two or more sensors of the plurality of sensors in combination to determine whether an enterprise-specific threshold for a respective combination of sensors has been surpassed.

15. The method of claim 14, wherein identifying the one or more notification actions for execution includes identifying the one or more notification actions based on whether the enterprise-specific threshold for the respective sensor was surpassed or the enterprise-specific threshold for the respective combination of sensors was surpassed.

16. The method of claim 13, further including:

receiving, by the at least one processor and via a feedback loop, response data received in response to executing the one or more notification actions; and updating or validating, by the at least one processor, the machine learning model based on the response data.

17. The method of claim 13, wherein sensors of the plurality of sensors are located in geographically disparate locations.

18. One or more non-transitory computer-readable media storing instructions that, when executed by a computing platform comprising at least one processor, memory, and a communication interface, cause the computing platform to:

receive first sensor data from a plurality of sensors in a sensor farm associated with an enterprise organization;

tune, based on the received first sensor data from the plurality of sensors, each sensor of the plurality of sensors, wherein tuning each sensor includes tuning one or more parameters of a respective sensor based on locality regulations of the respective sensors and regulatory requirements;

store, in a library of sensor personas, the tuned parameters of each sensor in a sensor persona associated with the respective sensor, wherein the sensor persona further includes enterprise-specific thresholds for the respective sensor;

execute a machine learning model to analyze the first sensor data, wherein analyzing the first sensor data includes:

evaluating the first sensor data to determine whether an enterprise-specific threshold for the first sensor has been surpassed;

responsive to determining that an enterprise-specific threshold for the first sensor has been surpassed, identify one or more notification actions for execution, wherein identifying one or more notification actions for execution includes identifying a geo-fenced area including an area impacted by an event associated with the first sensor data surpassing the enterprise-specific threshold; and execute the one or more notification actions, wherein executing the one or more notification actions includes at least transmitting a notification to users within the geo-fenced area; and responsive to determining that an enterprise specific threshold for the first sensor has not been surpassed, evaluate second sensor data received subsequent to the first sensor data;

detect addition of a new sensor of a first type of sensor;

determine whether a sensor persona exists for the first type of sensor;

responsive to determining that a sensor persona exists for the first type of sensor:

retrieve, from the library of sensor personas, the sensor persona for the first type of sensor; and install, on the new sensor of the first type of sensor, the sensor persona for the first type of sensor;

responsive to determining that a sensor persona does not exist for the first type of sensor:

install, on the new sensor of the first type of sensor, a generic persona; and tune, using data received from other sensors of the plurality of sensors, the generic persona installed on the new sensor of the first type.

19. The one or more non-transitory computer-readable media of claim 18, wherein evaluating the first sensor data to determine whether the enterprise-specific threshold has been surpassed further includes:

evaluating data from each sensor of the plurality of sensors to determine whether an enterprise-specific threshold for the respective sensor has been surpassed; and evaluating two or more sensors of the plurality of sensors in combination to determine whether an enterprise-specific threshold for a respective combination of sensors has been surpassed.

20. The one or more non-transitory computer-readable media of claim 19, wherein identifying the one or more notification actions for execution includes identifying the one or more notification actions based on whether the enterprise-specific threshold for the respective sensor was surpassed or the enterprise-specific threshold for the respective combination of sensors was surpassed.

* * * * *